United States Patent [19]
Porter et al.

[11] 3,769,830
[45] Nov. 6, 1973

[54] VISCUROMETER
[75] Inventors: John P. Porter, Cuyahoga Falls; Paul W. Karper, Stow, both of Ohio
[73] Assignee: The B. F. Goodrich Company, New York, N.Y.
[22] Filed: Sept. 1, 1972
[21] Appl. No.: 285,742

[52] U.S. Cl. ................................. 73/15.6, 73/101
[51] Int. Cl. ................................................ G01n 3/32
[58] Field of Search ............................. 73/101, 15.6

[56] References Cited
UNITED STATES PATENTS
3,531,996  10/1970  Harris et al. .................. 73/15.6 X
3,538,758  11/1970  Karper et al. ...................... 73/101

*Primary Examiner*—Jerry W. Myracle
*Attorney*—Joseph Januszkiewicz et al.

[57] ABSTRACT

A method and apparatus for determining the physical properties of vulcanizable elastomeric materials utilizing a cone-shaped oscillating rotor that is cooperative with a cone-shaped cavity in a stationary mold section whereby a sample of material is confined therebetween and subjected to a confining pressure, as well as an oscillating shearing force. The walls of the test chamber are heated to a predetermined temperature during cure, while torque sensing means are connected to the input of the rotor to measure the variation in force required to oscillate such projection. Means are provided to maintain a programmed confined pressure which is proportional to torque developed on the sample during the cure cycle compensating for any shrinkage of the sample. A recorder is connected to the torque sensing device to record the variations in shearing strain.

14 Claims, 6 Drawing Figures

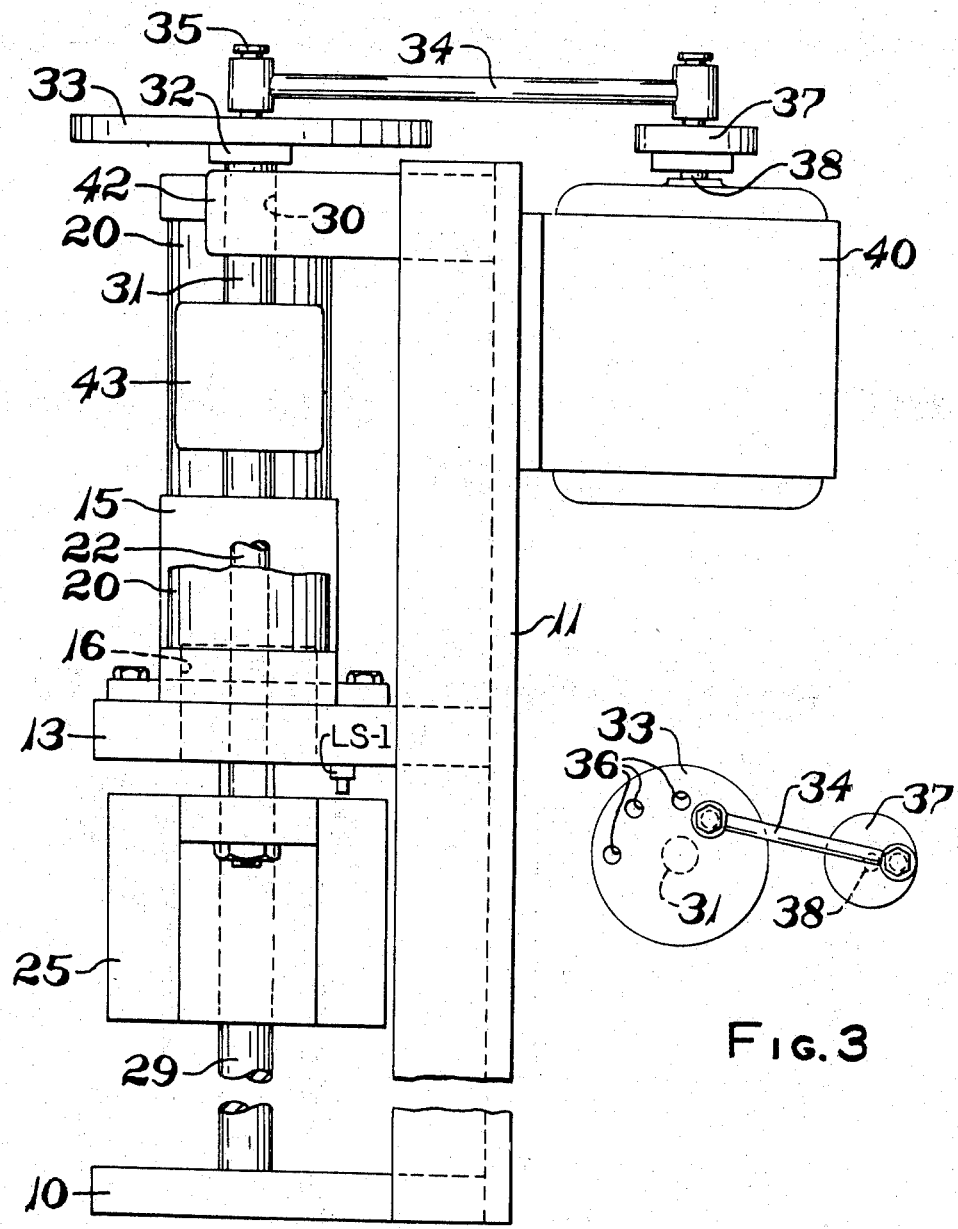

VISCUROMETER

BACKGROUND OF THE INVENTION

This invention relates to a method and test instrument of the viscurometer type which has refined control means which provides a test result of a cure curve that compensates for the shrinkage within a test sample during cure.

In the manufacture of articles made of elastomeric material, as well as in the research of these materials, it is necessary to determine the rate, extent of vulcanization and cure curve of these materials in order to provide the processing engineer with accurate data and parameters for the manufacture of these articles. It is necessary to provide an accurate cure curve, which curve accurately provides the scorch time, reversion and optimum cure time as well as the full time cure curve in order to accurately predict the heat history of the compound within accurate processing limitations. This is particularly important to the scientist so he may accurately predict results therefrom. Heretofore test instruments employed in obtaining cure curves failed to effectively take into account flow and/or shrinkage within the sample during cure. This is particularly significant since shrinkage is uneven and such shrinkage alters the cure curve. A test instrument not able to detect or compensate for shrinkage, could provide output data which would not properly indicate scorch and the interim points between it and maximum cure. This is particularly noticeable where the data apears to indicate a point of maximum cure, when, in actuality, the sample of material had not yet reached its full cure. With such results, shrinkage would provide spurious results and a processing engineer would improperly set his processing parameters. To minimize shrinkage by making the sample of material smaller adversely affects the accuracy and one would not be able to obtain the necessary reliable data for precise laboratory testing. To reduce the amplitude of stroke does not rectify the error as it reduces the sensitivity of the instrument which impairs its accuracy. Applicant's invention fully recognizes the slippage phenomena and accurately records and depicts the cure curve, even though shrinkage occurs within the sample and even though such shrinkage is uneven by so constructing the instrument as to maintain a true output which accurately depicts the cure curve of the sample of material at all times by increasing the pressure holding the sample of material and making it depend on the torque developed. By optimum cure time is meant the time to cure the compound at a given temperature to give some optimum physical properties. Scorch time refers to the time of the onset of cure at a given temperature. In order to properly establish controls over the manufacturing of items of elastomeric material, it is necessary to provide a test instrument that is reliable, versatile, sensitive and operative to quickly and accurately predict the true cure curve of a sample, taking into account shrinkage, and which instrument is able to accurately record the capability of the processing compound for laboratory and factory control.

SUMMARY OF THE INVENTION

The present invention provides a method and test instrument which accurately measures the dynamic properties of elastomeric material and which records such properties as a cure curve, taking into account shrinkage over the full curve and adjusting for shrinkage in the sample, taking into account the rate of cure.

The present invention contemplates the use of a pair of spaced members which are cooperative to define a double coned receptacle for the reception of a test sample with one member stationary and the other member being oscillated to provide a shearing force on the sample and with means provided to maintain a programmed pressure that is responsive to the torque developed between the spaced members which maintains intimate contact with the sample at all times.

BRIEF DESCRIPTION OF THE DRAWINGS

FIG. 2 is a side elevational view of the test instrument;

FIG. 3 is a plan view of the connection between the drive wheels for oscillating the rotor;

DETAILED DESCRIPTION

Figure 1:
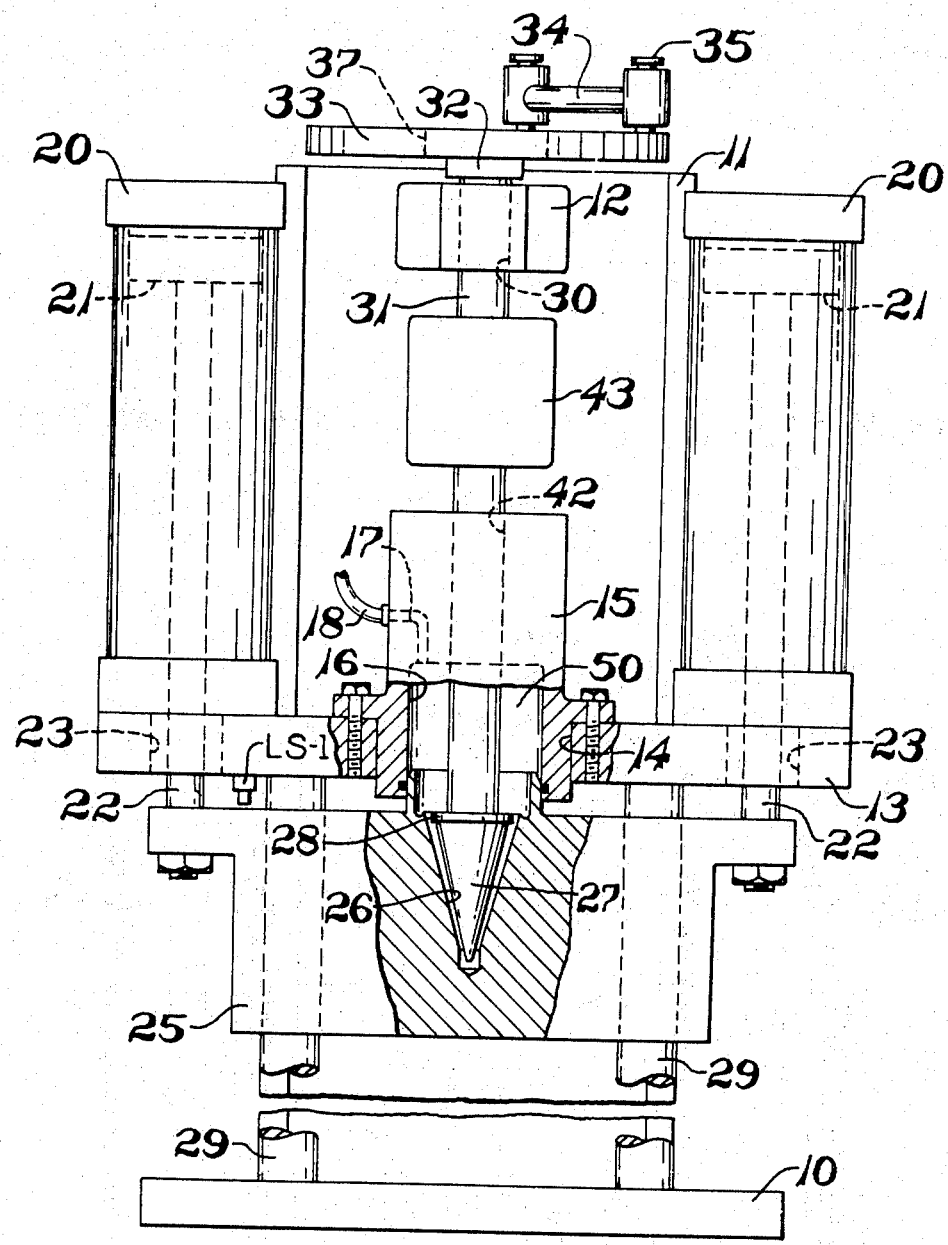
FIG. 1 is a front elevational view of the test instrument with a portion thereof shown in cross section.

Referring to the drawings wherein like reference characters designate like or corresponding parts throughout the several views, there is shown in FIG. 1 a base plate 10 having attached to its rear end portion an upwardly extending back plate 11. Back plate 11 has an upper bracket 12 and a lower elongated bracket 13 secured respectively to the upper end and intermediate portion thereof. Bracket 13 has a bore 14 located in the central portion thereof to receive a cylindrical member 15, which member 15 has a cylindrical recess 16 with a conduit 18 which is adpated to be connected to a suitable pressure source. Secured to the respective end portions of bracket 13 are cylinders 20 which have pistons 21 and downwardly extending piston rods 22 respectively extending through bores 23 in the respective end portions of such bracket 13 for connection to a stator member or carrier member 25. Carrier member 25 has a conically shaped serrated recess or cavity 26 at its center portion which is adapted to receive a cone-shaped serrated rotor 27 for a purpose to be described. Rotor 27 has a lip 28 on its base portion for cooperation with the base of recess 26 to define a substantially closed cavity with a restrictive passageway thereby. Rotor 27, and lip 28, cooperate with the cylindrical recess 16 of cylindrical member 15 to define a pressure dome 50 that is adapted to communicate with the cavity defined by recess 26 and rotor 27. Carrier member or stator member 25 is guided in its vertical upward and downward movement by a pair of spaced guide rods 29 which are secured to a base plate 10 and bracket 13 respectively. Upper bracket 12 has a central bore 30 which rotatably receives a shaft 31 journaled in a bushing 32 for connection to a wheel member 33 for rotation therewith. As shown in FIGS. 2 and 3, one end of a crank member 34 is pivotably mounted by means of a movable pin 35 to wheel member 33. As seen in FIG. 3, wheel member 33 has a plurality of pin-receiving index holes 36, each at a different radial spacing from the vertical axis of wheel 33. An eccentric drive wheel 37 is mounted on an output shaft 38 of a variable speed motor 40. The other end portion of crank member 34 is pivotably mounted to such eccentric drive wheel 37 to transfer the rotational movement of shaft 38 to an escillating motion oscillating wheel 33 and shaft 31. The amplitude of the oscillation of wheel 33 is dependent upon the particular mounting of pin 35 in index holes 36 of the wheel 33, while the frequency of oscillation is dependent upon the output speed of the variable speed motor 40. If desired, such variable speed motor may be connected to suitable transmission means which in turn may control the speed of the output shaft 38. However, for simplicity of illustration, motor 40 is shown as directly connected to the output shaft 38.

Shaft 31 extends downwardly through a central bore 42 in cylindrical member 15 for connection to the cone rotor 27 to provide the oscillation thereto. Mounted on shaft 31 is a torque cell or torque sensing pickup device 43 which responds to torque forces in shaft 31 to provide an input to a peak picker circuit, designated generally as 45 via electrical lines 46 and 47. Such circuit is disclosed in U.S. Pat. No. 3,513,693, which circuit is incorporated herein by reference. The oscillating shearing forces or torque developed on the sample of material are cyclically varying and generally sinusoidal in nature and the peak picker circuit which includes a memory circuit provides an output signal that is conveyed as a substantially linear signal via electrical lines 48 and 49 to recorder 51. Recorder 51 has a suitable pen which graphically draws on its chart the torque values as a function of time. Such pickup device 43 may comprise a bonded resistance wire strain gauge, well known in the art and, therefore, neither illustrated nor described, wherein such wire gauges are bonded to the shaft 31 in such a position and are so connected into a bridge circuit, that they cancel the effects of bending and thrust strains, while adding the effects of torsional strain, with the relation between bridge unbalance and torsional strain being linear. Such pickup devices are manufactured by the Baldwin-Lima-Hamilton Corporation, located in Waltham, Massachusetts, and being known as type B torque pickup. Such devices are also manufactured by Lebow Associates, Inc., located in Oak Park, Michigan; and being known as model 2102-200.

Figure 4:
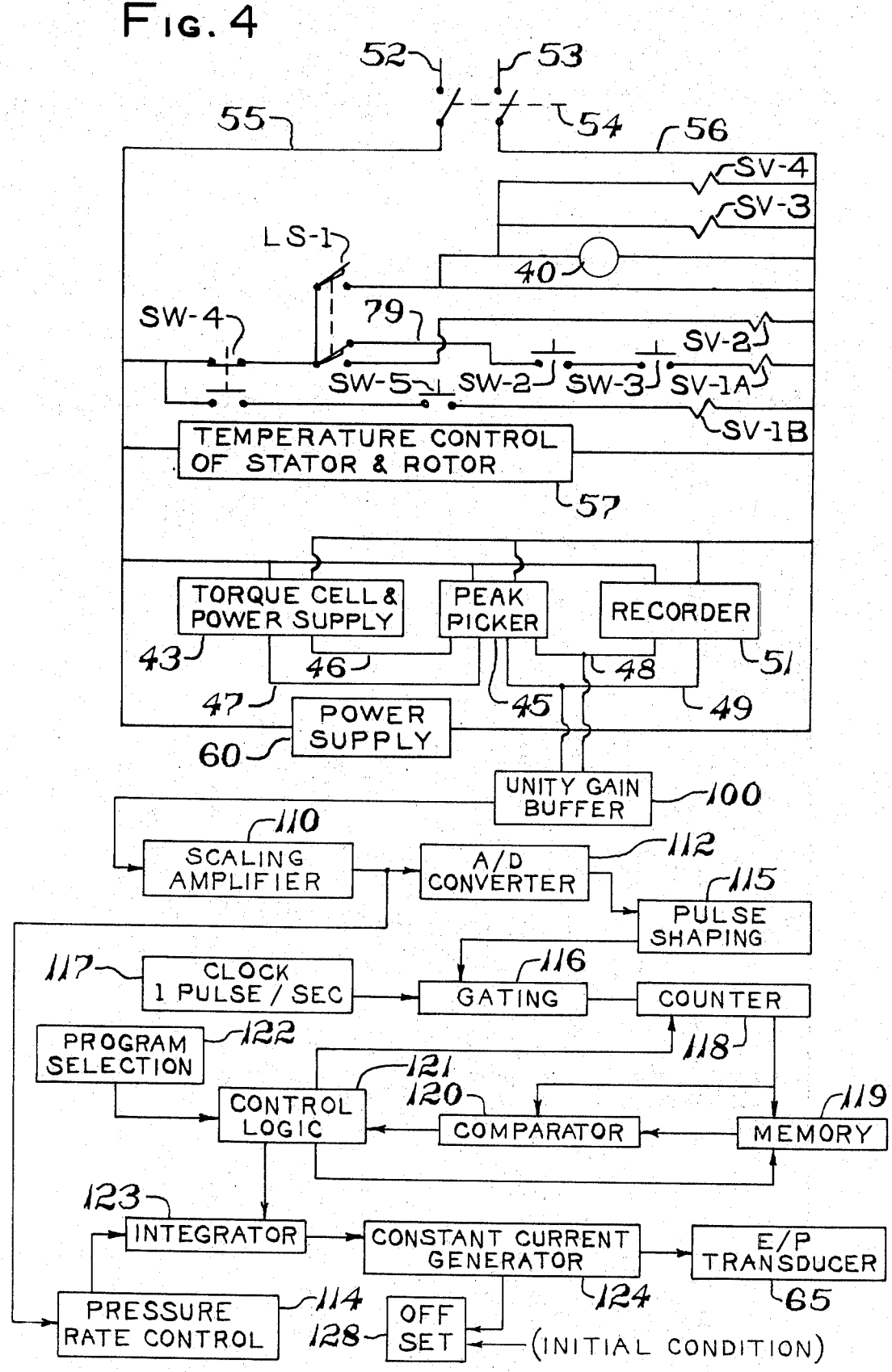
FIG. 4 illustrates the electrical control circuit for the test instrument.
Figure 5:
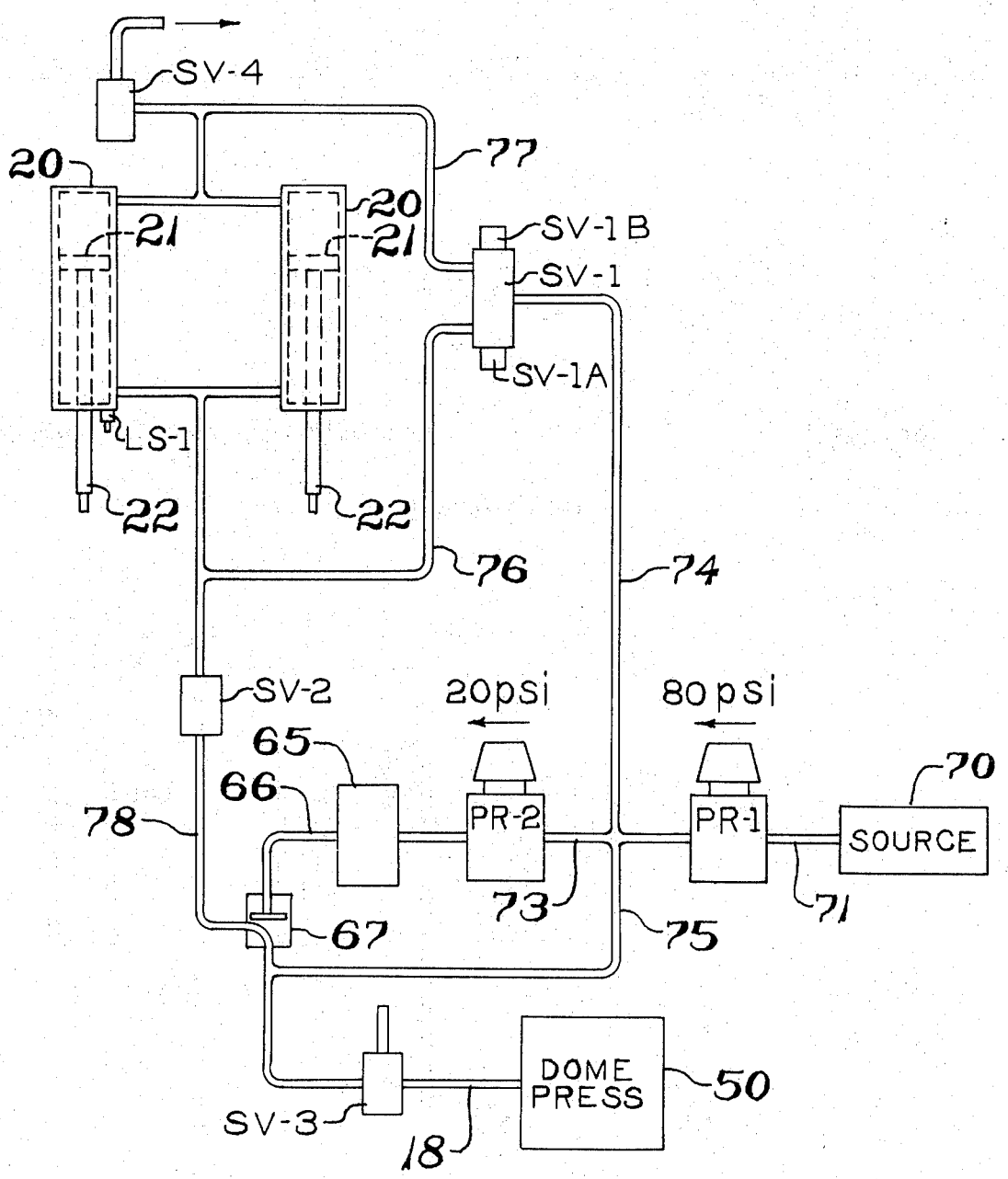
FIG. 5 illustrates the hydraulic circuit for the test instrument.
Figure 6:
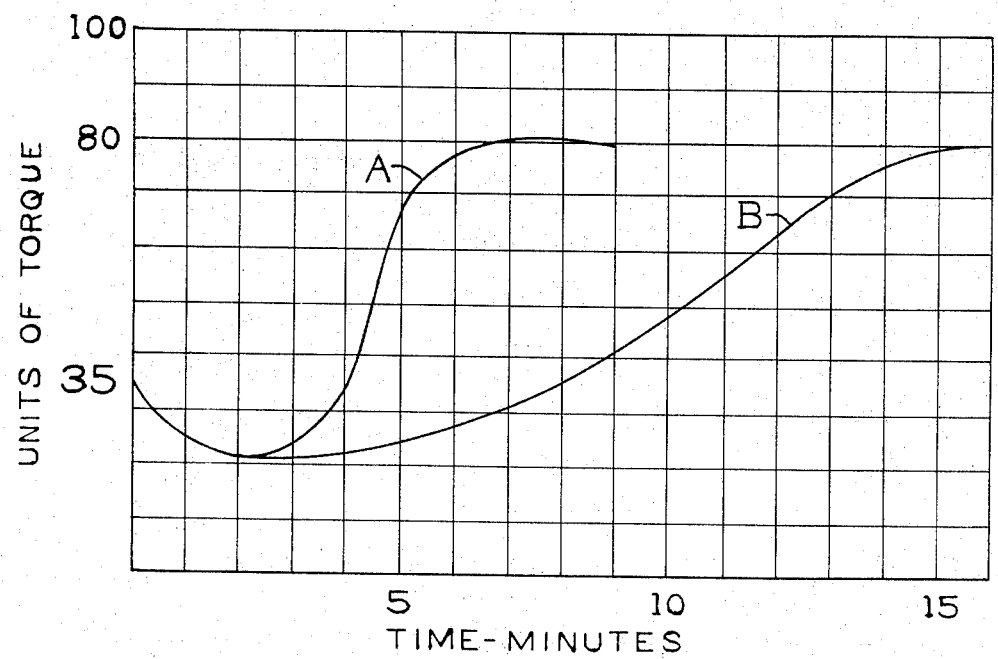
FIG. 6 is a chart illustrating the output of the torque cell as modified by the control circuit.

The electrical power for the control operation is supplied by the electrical lines 52 and 53 which are connected to a source of electrical power not shown. A double pole, single throw switch 54 connects lines 52 and 53 to main control lines or conductors 55 and 56 which lead to the torque pickup recorder 51, as well as the temperature control means 57. Suitable branch lines not shown are provided to supply current from the control means in a manner well known in the art to regulate the heating coils for the rotor 27 and the carrier member 25 to maintain a preselected temperature on the sample located between the cone-shaped cavity 26 and the cone rotor 27. Power is supplied from main control lines 52 and 53 via lines or conductors 55 and 56 to power supply unit 60 which provides power for the integrator 123. An electric-to-pneumatic transducer 65 is shown in FIG. 4 and FIG. 5, which transducer 65 is operative to control the pressure in the cylinders 20 which, in turn, control the pressure on the sample by the die members. Electric-to-pneumatic transducer 65 transmits a pneumatic output signal (FIG. 5) via conduit 66 to a booster relay 67, which output signal is proportional to a D.C. milliampere input signal from a constant current generator 124. The transducer 65 receives an electrical signal and transfers such output signal into a pneumatic output. Such devices are available commercially as from Moore Products Company, Spring House, Pennsylvania. The transducer 65 is a force-balance instrument, wherein the force of the output pressure balances the force produced on the output coil of the input current and a permanent magnet field such as to transfer an input in the range of 4–20 milliamps to a 3–15 psi pneumatic output.

FIG. 5 illustrates the pneumatic control system wherein cylinders 20–20 control the closing pressure of the stator member 25 on the sample of material confined between cavity 26 and rotor 27 as well as programmed pressures thereon in a manner to be described.

A source of pressurized fluid is conducted from a source indicated generally as 70 via conduit 71 to a pressure regulator valve PR-1 which can be set to provide a predetermined line pressure in conduits 73, 74 and 75. For purposes of illustration, the line pressure in conduit 73 is set at 80 psi. Conduit 75 is connected via solenoid controlled valve SV-3 to pressure dome 50. Conduit 74 is connected via solenoid operated valve SV-1 either to pressurize the rod end of cylinders 20 via conduit 76, or to exhaust via conduit 77 and solenoid operated valve SV-4. Conduit 73 is connected to a pressure regulator valve PR-2 whose output is set at 20 psi. The output of pressure regulator valve PR-2 is conducted to electric-to-pneumatic transducer 65 whose output is conducted to booster relay 67 via conduit 66. Booster relay 67 multiplies the pressure output from transducer 65 by a factor of six times, such that the output (18–90 psi) from booster relay 67 to conduit 78 is six times the output pressure (3–15 psi) from transducer 65. Conduit 78 controls the pressurization of the rod end of cylinders 20 via solenoid operated valve SV-2. Solenoid operated valves SV-4, SV-3 and SV-2 as well as energization of relay K-1 and motor 40, are controlled by limit switch LS-1 (FIGS. 1, 2, and 4) and switch SW-4. Limit switch LS-1 is set to be actuated at approximately 0.025 inches of mechanical closure of cone-shaped rotor 27 within cone-shaped recess 26. Prior to closure of limit switch LS-1, power line 55 is connected via line 79 through normally open switches SW-2 and SW-3 to the solenoid SV-1A of solenoid operated valve SV-1. Upon closure of switches SW-2, SW-3 and energization of solenoid SV-1A, valve SV-1 directs the pressurized fluid from source 70 to pressurize the rod end of cylinders 20. Solenoid SV-1B of valve SV-1 is energized by depressing or actuating switch SW-4 which connects power line 55 via depressed switch SW-5 which action connects the pressurized source via conduit 74 and 77 to the head end of cylinders 20.

The temperature control circuit for the stator 25 and rotor 27 are conditioned for operation along with the circuit for the recorder 51, peak picker circuit 45 and the torque cell 43 by closing switch 54.

With the rotor 27 separated and spaced from the coneshaped cavity 26, the operator inserts a sample of material to be tested into the test cavity 26. The operator then depresses the push buttons for switches SW-2 and SW-3 to energize solenoid SV-1A which connects the pressure source 70 via conduit 71 through pressure regulator valve PR-1 (which is set at 80 psi) thence via conduit 74 to solenoid operated valve SV-1 which directs the pressurized fluid to the rod end of cylinders 20 via conduit 76. Such action moves the carrier member 25 upwardly towards a closing position, until limit switch LS-1 is actuated. The closing pressure is set at 80 psi (of the example chosen) and is of sufficient value to effect a shaping and molding of the sample to the shape of the mold and mold cavity. Prior to the actuation of limit switch LS-1, a relay is used and is in the deenergized condition maintaining the voltage out of the integrator at zero voltage and is used to reset a control logic 121 to the integrator 123. Upon closing of the rotor 27 onto the sample held by the cavity 26 of stator 25, limit switch LS-1 is actuated, solenoid SV-1A is deenergized while solenoids of valves SV-2, SV-3, SV-4 and relay K-1 are energized. Energization of solenoid operated valve SV-3 connects the pressurized fluid from source 70 and pressure regulator valve PR-1 to the dome chamber 50 which establishes dome pressure to prevent porosity during cure. As an example, the dome pressure can be set at 60 psi. Energization of solenoid operated valve SV-4 connects conduits 76 and 77 to exhaust, while energization of valve SV-2 connects the pressure source 70 via conduits 71, 73 and 75 to booster relay 67 which directs the pressure fluid via line 78, through valve SV-2 to the rod end of cylinders 20 at a reduced pressure as controlled by a primary preset pressure of 35 psi set by the offset control 128 which sets the output of the summing constant current generator 124 which, in turn, controls electric-to-pneumatic transducer 65 and relay 67. With the required circuitry the current can be increased to the transducer 65 via the integrator 123 which is responsive to the torque developed as to be described. The pneumatic output of transducer 65 is proportional to the controlled input signal from the integrator circuit. Such action will provide for a programmed pressure that is responsive to the torque developed between the stator 25 and the rotor 27 as determined by the torque cell 43.

Thus, prior to the closing of the rotor 27 on the test sample, the closing pressure was 80 psi; however, on the closing of the rotor on the test sample in cavity 26 to approximately 0.025 of an inch of complete closure, the cylinders 20 exert a primary preset pressure as an example of 35 psi until the circuit described provides a signal to transducer 65 to control relay 67 which in turn makes the control pressure responsive to torque developed. With the motor energized and operating for oscillating the rotor 15, an input signal is fed to the peak picker 45.

The output signal from the peak picker is received by a buffer amplifier 100, which output signal is equal to the peak torque of the load cell 43. The buffer amplifier 100 is used to prevent loading of the existing electronic signal and conditioning its input impedance. The output impedance is low with an output voltage gain of 1. An amplifier 110 receives the signal from amplifier 100 and provides a voltage gain of 100 wherein the input is of 0–50 mv and the output is from 0–5 volts representing, i.e., 0–100 inch pounds of torque from the peak picker 45. The output of the amplifier 110 is also fed to a pressure rate control unit 114 for a purpose to be described. A pulse shaping network 115 receives the digital signal from the analog to digital converter 112. Analog to Digital Converter Unit 112 which includes an amplifier and transistors with associated resistors and capacitors converts the signal from an analog signal to a digital signal with an output of from zero to 500 pulses per second proportional to the applied peak torque and is directed to the pulse shaping unit 115 which shapes the pulses for passage through the Gating Unit 116 for counting by the counter unit 118. Gating Unit 116 permits the pulses through for a full second as controlled by a clock unit 117 which, in turn, resets the Gating Unit 116 every second or any other prescribed unit of time. Counter unit 118 feeds the pulse signal to a memory storage unit 119 and the comparator 120; however, the comparator 120 compares the signal with the previous signal that was sent to the memory storage unit 119. Each succeeding signal from the counter unit 118 that is fed to the memory storage unit 119 wipes out the previous signal but not until such previous signal is read and compared. The comparator 120 compares the new signal with the stored signal and provides a signal that is the difference therebetween, which is fed to the control logic unit 121. Control logic unit 121, which is preset by the program selection unit 122, actuates a control signal whenever the difference exceeds the preset amount such as three units of torque above minimum viscosity as determined by program selection unit 122 via integrator 123 and the summing constant current generator 124 which, in turn, sends a signal to E/P (electric-to-pneumatic) transducer 65 to actuate the controlled rate of pressure increase to a new holding pressure on the cylinders 20 which maintain the die members in their closed position. This is accomplished in cooperation with the E/P transducer 65 which, as described above, controls the pressure on cylinders 20 and makes such die members exert a pressure on the sample by a force which is proportional to the torque developed. Thus, the pressure from cylinder 20 is responsive to change in volume and any shrinkage in the sample since the integrator responds to the applied torque as a function of time and will send a signal to the transducer 65. As an example of the type of signal that such circuit can detect, note FIG. X wherein curve A depicts a compound which has a rapid cure whereas curve B depicts a compound that has a relatively slow cure of about 16 minutes. With the use of the circuit of FIG. 4, the operator is assured that the readings depict the correct cure value since the pressure in cylinder 20 is increased as the torque response from the torque cell 43 monitors the cure and when the torque increases, will increase the pressure in cylinder 20 as described above. Thus, there is assurance that the die members which hold the sample of material to be tested will maintain full contact with the sample of material as it cures and shrinks. The increase in pressure on cylinder 20 in curve A occurs in approximately 3 minutes while in curve B the same increase is distributed over 12 minutes. This is significant in that the monitoring of the torque occurs over the full length of the cure curve and properly maintains contact between the die members rather than arbitrarily increase the pressure.

Various modifications are contemplated and may obviously be resorted to by those skilled in the art without departing from the described invention, as hereinafter defined by the appended claims, as only a preferred embodiment thereof has been disclosed.

We claim:

1. An apparatus for determining the physical properties of vulcanizable elastomeric material comprising die means cooperable to define a test sample receiving chamber for receiving a test sample for testing such materials, means connected to one of said die means for oscillation thereof to provide a shearing force on said sample in said test chamber, means operatively connected to said oscillating means for measuring said shearing force and providing an output signal therefrom, means to move said die means into cooperative engagement with the sample to maintain a pressure on said sample of material held by said die means; means to heat said die means to a predetermined temperature, indicator means operative to receive said output signal for indicating its progressive value for use in analyzing said materials, and circuit means operatively connected to said means for moving said die means into cooperative engagement with said sample and operative to provide a controlled programmed pressure thereon that is responsive to the torque developed by said die means.

2. An apparatus as set forth in claim 1 wherein said circuit means is responsive to provide said programmed pressure after a minimum viscosity is reached.

3. An apparatus as set forth in claim 1 wherein said means for moving said die means into cooperative engagement with the sample is air cylinder means, and said circuit means for providing a controlled programmed pressure on said air cylinder means of said moving means includes circuit means that are energizable to provide an increasing pressure to said air cylinder that is proportional to the torque developed.

4. An apparatus as set forth in claim 3 wherein said circuit means includes means for increasing said pressure to a preset limit.

5. An apparatus for determining the physical properties of vulcanizable elastomeric material comprising a pair of die means that are movable toward and away from each other; said die means are cooperable to define a test sample receiving chamber with an annular opening between said die means when moved toward each other and wherein said chamber receives a test sample; means connected to one of said die means for oscillation thereof to provide a shearing force on said sample in said test chamber; means operatively connected to said oscillating means for measuring said shearing force and providing an output signal therefrom; means to move the other of said die means relative to and toward said one die means for cooperative engagement with the sample to maintain a pressure on said sample held between said die means; a pressure dome providing a closure for said opening between said die means; means to supply pressurized fluid to said pressure dome under controlled pressure to maintain a preselected fluid pressure on a test sample confined in said test chamber; means to heat said die means to a predetermined temperature; indicator means operative to receive said output signal for indicating its progressive value for use in analyzing said materials; and means operatively connected to said die moving means to provide a pressure that is proportional to the torque developed in response to a signal received from said means for measuring said shearing forces.

6. An apparatus as set forth in claim 5 wherein said apparatus has a housing; said die means are cooperative to define a hollow cone cavity with a restrictive opening along the upper end portion of said hollow cone cavity; said die means are cooperative with said housing to define said pressure dome that communicates with said hollow cone cavity through said restrictive opening; and said means for providing said pressure on said die means includes a pressure programmer means; said pressure programmer includes a counter means, a memory circuit means, program selection means, and a comparison circuit means; said counter means is responsive to said first mentioned output signal to provide a second output signal for storage in said memory circuit; a timing means connected to said counter means for clearing said counter means at preselected time intervals to permit said counter means to receive said output signal from said measuring means; said comparison circuit means interconnecting said memory circuit means and said counter means for comparison of said outputs and operable to provide an output signal that is the difference therebetween, said programmed selection means cooperative with said comparison circuit for limiting the output signal from said comparison circuit to signals above a preset limit; and integrator circuit means operative to receive said output signal above said preset limit to actuate an increase in pressure to said means for providing said pressure on said die means, which pressure increase is proportional to the torque developed by said die means.

7. An apparatus for determining the physical properties of vulcanizable elastomeric materials comprising a pair of spaced die members cooperable to define a test chamber and hold a sample of material therebetween; oscillating means operatively connected to one of said die members for oscillating said one die member relative to the other die member to provide a shearing force on said sample received by said test chamber; measuring means operatively connected to said oscillating means for measuring said shearing force and providing an output signal therefrom; means to heat said die members to a preselected temperature; means operative to receive said output signal for indicating its progressive value; air cylinder means operatively interconnecting said die members to move said other die member toward said one member into cooperative engagement with a test sample held in said test chamber to provide a pressure thereon; control means connected to said air cylinder means to provide a primary pressure followed by a secondary pressure; and said secondary pressure is a programmed pressure that is proportional to the torque developed from said die members.

8. An apparatus for determining the physical properties of vulcanizable elastomeric materials as set forth in claim 7 wherein said control means has a time delay means for holding said secondary pressure at a constant pressure for a predetermined time interval and thence increasing said secondary pressure in response to said torque developed.

9. An apparatus for determining the physical properties of vulcanizable materials as set forth in claim 8 wherein said secondary pressure is set to reach a predetermined maximum pressure.

10. A method for determining physical properties of elastomeric materials comprising: subjecting a sample of material to a first confining pressure, heating such sample to a predetermined temperature thence subjecting said confined heating sample to oscillating shearing strains from an input source having predetermined constant rate and amplitude of oscillation, measuring resistance to said shearing strains to provide an output torque signal; subjecting said sample of material to a second pressure different than said first pressure which second pressure is a controlled programmed pressure that is proportional to said torque developed.

11. A method for determining physical properties of elastomeric materials as set forth in claim 10 wherein said second pressure is held constant for a predetermined period of time prior to said initiation of said pressure that is responsive to said developed torque.

12. A method for determining physical properties of elastomeric materials comprising: subjecting a confined sample of material to a first pressure for a predetermined period of time, heating such sample to a predetermined temperature, subjecting said confined heated sample to oscillating shearing strain from an input source, subjecting said sample of material to a secondary confining pressure that is proportional to said shearing strain developed after elapse of said predetermined time while being subjected to said oscillating shearing strain; and measuring the torsional resistance to these shearing strains.

13. The method for determining the physical properties as set forth in claim 12 wherein said secondary pressure is for a predetermined time interval.

14. The method for determining the shearing torque as set forth in claim 13 wherein said subjecting of said sample of material to said secondary pressure is after the scorch point of the material is reached.

* * * * *